April 24, 1934. D. V. WADSWORTH ET AL 1,956,260
METHOD OF TREATING SUGAR MELTS
Original Filed Sept. 27, 1929
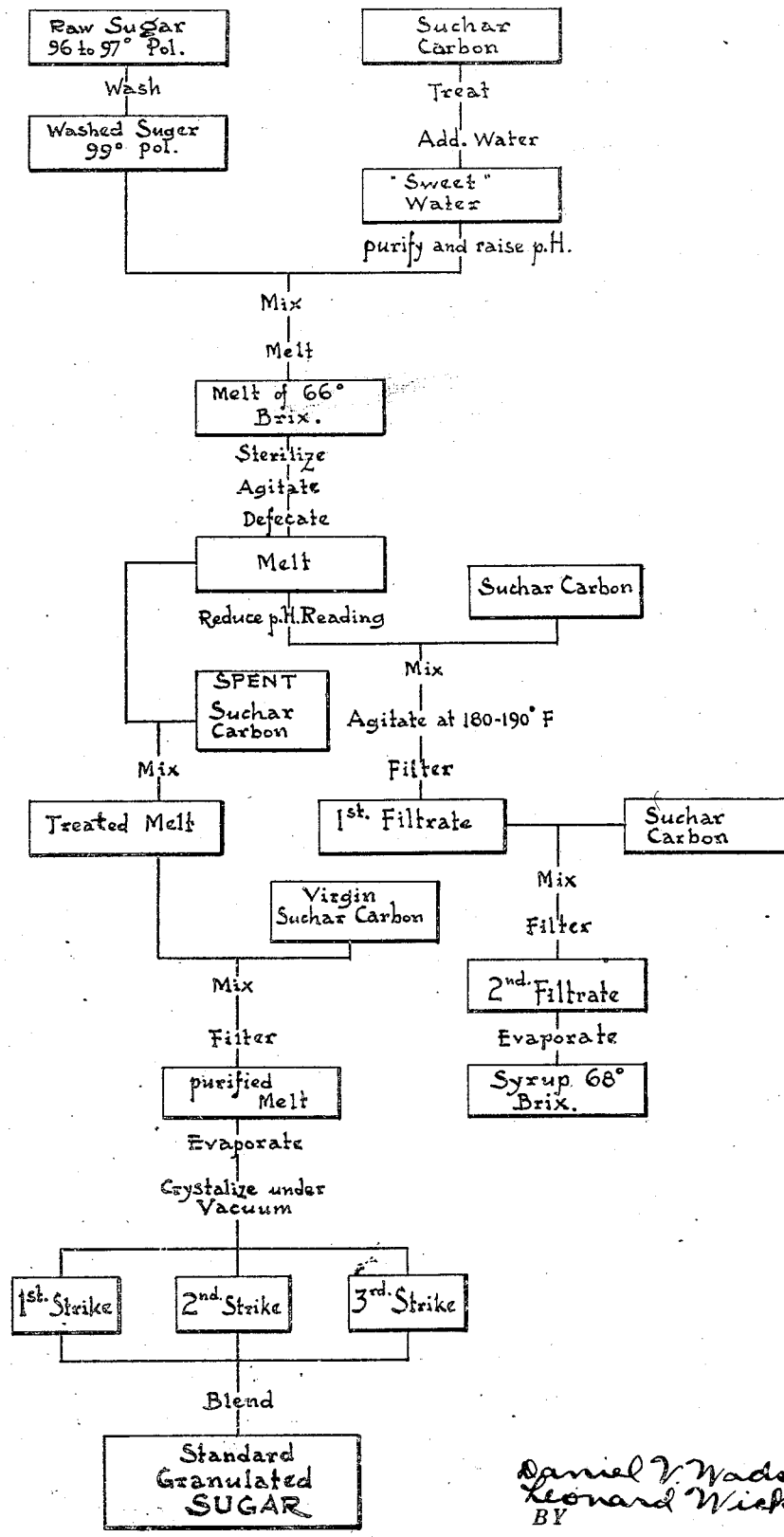
INVENTORS
Daniel V. Wadsworth and
Leonard Wickenden
BY
their ATTORNEY
Edward M. Evarts Patented Apr. 24, 1934

1,956,260

UNITED STATES PATENT OFFICE 1,956,260

METHOD OF TREATING SUGAR MELTS

Daniel V. Wadsworth and Leonard Wickenden, Manhasset, N. Y., assignors to John J. Naugle, Greenwich, Conn.

Application September 27, 1929, Serial No. 395,524
Renewed July 12, 1933

5 Claims. (Cl. 127—48)

REISSUED
JUN 25 1940

Our present invention relates to methods of treating sugar melts and syrups, particularly raw sugar melts, especially washed raw sugar melts, in such a way as to render the impurities present in such melts more readily adsorbable and such melts more readily filterable than where the same have been kept either in storage or transportation, or both, for considerable periods of time, and aims to device methods of the general character specified which are simple, which may be easily and conveniently practised and which are highly successful for the designated purposes. Other objects and advantages of the methods of the present invention, particularly as exemplified in the following illustrative embodiments of the same, will in part be pointed out in detail hereinafter and will in part be obvious to those skilled in the art to which the present invention relates.

In the accompanying specification we shall describe and in the annexed drawing more or less diagrammatically exemplify, several illustrative embodiments of the methods of the present invention. It is, however, to be clearly understood that our invention is not limited to the specific embodiments thereof herein described and more or less diagrammatically exemplified for purposes of illustration merely.

Referring to the drawing, in which we have more or less diagrammatically exemplified the aforesaid illustrative embodiments of the methods of the present invention, the single figure of the same comprises a schematic arrangement of steps which may be followed in practising the aforesaid illustrative embodiments of the methods of the present invention.

Referring now to the aforesaid illustrative embodiments of the present invention, our starting or raw material is preferably raw sugar having an average polarization of from about 96 to about 97 degrees. Ordinarily we use raw cane sugar such as Cuban raw, although, of course, raw cane sugar from other sources, as from Porto Rico, the Philippines, the Hawaiian Islands, Santo Domingo and Haiti may be used with equal success, as well as raw sugars derived from other sources.

We now proceed to wash the raw sugar. This we may do in centrifugals in accordance with the practice hitherto prevailing. In these centrifugals the sugar is washed to a purity of about 99 degrees polarization. It may here be stated that the initial unwashed raw sugars whose polarization is from about 96 degrees to about 97 degrees contains, in addition to the sucrose, in the case of sugar of 97 degrees polarization, for example, about 1 per cent. of invert sugar, about ½ per cent. of ash, about 1 per cent. of organic impurities and about ½ per cent. of water. The washed raw sugar on the other hand having a purity of about 99 degrees polarization, contains about 1 per cent. of invert sugar and organic impurities, about ½ per cent. ash and about ½ per cent. water.

The result of the washing operation is therefore to obtain washed raw sugar of the designated purity and composition and the type of syrups known as "affinations". These affinations are preferably boiled in a vacuum pan to obtain raw sugar, the final by-product being molasses. The raw sugar obtained from boiling the affinations is preferably mixed with the incoming raw sugar and washed in the manner already indicated above.

The next step of the operation is the melting of the washed sugar. This is preferably carried out in the following manner: We prefer to carry out the melting operation at a temperature of about 150 degrees F. While the sugar may be melted in pure hot water, we prefer to melt the same in hot "sweet" water, that is, in water which contains some sugar values, as the sugar values derived by treating the purifying and filtering media subsequently described to remove the last traces of sugar therefrom.

In conducting the melting operation we prefer that the water used for melting, whether ordinary water or "sweet" water, shall be substantially free from iron. For this purpose we may treat either the ordinary water or the "sweet" water with a suitable reagent, such as a solution of disodium phosphate, to precipitate the iron which may afterwards be removed by decantation or filtration, as desired. We prefer also to treat the ordinary or "sweet" water with an agent which will tend to raise its pH and thus lower the hydrogen ion concentration both of the water used for melting and of the resulting melt.

At this point it may be desirable to point out that whereas the hydrogen ion concentration of the washed raw sugar melt without treatment would ordinarily be from about 6.0 to about 6.5, where the melt has been treated, as by the treatment of the ordinary water or "sweet" water used for melting with disodium phosphate, the pH will be raised to about 7.3 corresponding to a diminished hydrogen ion concentration. This is an important feature if the amount of invert sugar present in the final melt is to be kept at a relatively low figure. Accordingly, we use a slight excess of disodium phosphate, which reagent will therefore serve not only to precipitate iron, but also to raise the pH reading and thus lower the hydrogen ion concentration.

Where, as is preferred, "sweet" water is used for melting the washed raw sugar, the amount of disodium phosphate used, both for precipitating iron and for increasing the pH reading and thus for lowering the hydrogen ion concentration may range from about 20 to about 50 pounds of the crystalline disodium salt per 2000 gallons of "sweet" or other water used for the melting process. This would correspond to from about 8 to about 20 pounds of the anhydrous salt per 2000 gallons of "sweet" or other water used for the melting operation.

We prefer that the density of the resulting melt shall be about 68 degrees Brix. more or less. The temperature of the hot melt will shortly fall to about 100 degrees F. It may here be stated that we prefer that after the temperature of the melt has been stabilized at about 100° F., it shall be maintained at such temperatures throughout the storage and transportation of the melt unless and until otherwise indicated in later portions of this specification. The melt so obtained may be suitably stored in tanks or may be transferred directly to the hold of a tank steamer or to tanks on a tank or freight steamer. Before this is done, however, the melt is preferably given a sterilizing treatment, that is, a treatment which will kill any yeast and thus prevent the growth of invertase from yeast and will also kill bacteria, mold and other undesirable agencies which may be present in the melt and which would tend to adversely affect it commercially. While we may use various sterilizing agents for this purpose, such as ozone, ultra-violet light, and certain oxides of nitrogen, we prefer to use a chlorine generating agent, such as chlorine gas, either in gaseous or liquid form or in the form of an aqueous solution. Ordinarily, however, we use a hypochlorite, preferably a hypochlorite of one of the alkali or alkaline earth metals, such as calcium hypochlorite, preferably in the form of "bleach liquor". This latter substance not only has the property of sterilizing the melt so as to prevent the growth of yeast, invertase, bacteria, molds and other undesirable agencies, but also helps to further increase the pH reading and thus to diminish the hydrogen ion concentration. This latter factor is of great importance since a high pH reading, corresponding to neutrality or even slight alkalinity of the melt, will minimize the growth of yeast, since yeast grows most favorably in a slightly acid solution. Furthermore, the high concentration of the melt at about 68 degrees more or less helps further to minimize fermentation. It may here be stated that the use of calcium hypochlorite or its equivalent, preferably in the form of "bleach liquor", will serve to check the growth of yeast, fungi, molds, etc.

It may here be stated that the sterilization treatment with the calcium hypochlorite in the form of bleach liquor, for example, or its equivalent may take place either in the storage tanks or in the tank steamer or in the tanks aboard the freight or tank steamer or in both of these places. The idea in each case is to keep the melt sterile and thus to prevent the growth of yeast, invertase, bacteria and molds at all times until the final product, either in the form of refined, substantially colorless syrup, or granulated sugar, is ultimately obtained. In treating the melt with the calcium hypochlorite solution or equivalent sterilizing agent, we may proceed substantially as follows:

Assuming that bleach liquor is the sterilizing agency to be employed, the bleach liquor for this purpose may be prepared from solid calcium hypochlorite or chloride of lime by stirring the solid with water until all of the soluble matter present has gone into solution. The clear solution thus obtained may now be decanted from the insoluble matter. The proportions used in making the liquid may be about 35 pounds of chloride of lime and about 40 gallons of water. About 18 gallons of the clear liquor may be run through a pipe to the bottom of the tank containing about 3000 gallons of say 68 degrees Brix. melt. This will correspond, for example, to about 19,600 pounds of sugar solids in solution. During this time the average temperature of the melt may be kept at about normal temperature corresponding to about 70 or 80 degrees F., although higher temperatures may if desired be employed.

The mixture of melt and sterilizing agent, the pH of which will now be about 7.3 or about 7.5 will be agitated and then permitted to stand for about 15 minutes in order to permit the sterilizing action to be completed. At this point any calcium or iron present in the melt may again be precipitated by the addition of a mixture of mono-sodium and disodium phosphates or by the addition of these phosphates separately or alone. For example, to about 3000 gallons of melt at a density of about 68 degrees Brix. may be added about 37½ pounds of disodium phosphate in the crystalline condition, corresponding to approximately 14½ pounds of anhydrous disodium phosphate and about 11½ pounds of the monosodium phosphate which is used in the form of the solid. During and after a brief period after the addition of the monosodium and disodium phosphates or their equivalents, the melts are briefly and vigorously agitated. After the precipitation, corresponding to a defecation of the melt, is completed, the agitation may be stopped for a period sufficient to permit the precipitates to agglomerate and settle.

The sterilizing treatment described above may be repeated several times while the melt is being stored, depending on the time during which it is stored and may also be repeated while the melt is in transit either in the hold of a tank steamer or in tanks on a freight steamer. Throughout careful consideration should be given to the pH readings and to the sterile condition of the melt so that inversion due to acidity and invertase will be minimized and fermentation and mold due to yeast, bacteria and molds of various sorts will likewise be minimized.

When the melt arrives at its destination, it is refined or decolorized. For this purpose its concentration is reduced, as to about 50 to 60 degrees Brix. so as to facilitate the filtering and decolorizing operations. The melt, now of reduced concentration, is subjected to a treatment with a purifying and filtering medium as with a suitable amount of a decolorizing carbon, preferably a decolorizing carbon of vegetable origin, such as the highly activated decolorizing carbon known to the trade as "Suchar" which is derived from carbonized lignin residues and is adapted to be revivified any number of times with complete restoration of its decolorizing powers. Not only is this true of the carbon "Suchar" but it also has the additional property, very important for the purposes of the present invention, that it is substantially neutral and will not therefore substantially affect the pH reading of the melt and thus introduce factors which might upset the practice of the process and might increase inversion of the sucrose, factors which generally follow from the use of other types of carbon. The decolorizing carbon "Suchar" is fully described and is claimed in a patent issued February 5, 1929, to John J. Naugle, No. 1,701,272, entitled "Electric furnace product".

Ordinarily, where "Suchar" is used, we use an amount of "Suchar" equal to about 2 per cent. of the weight of the sugar solids present in the melt. The mixture of melt and suspended carbon is thoroughly agitated in a tank, the melt being preferably heated to and maintained at a temperature of from about 170 to about 200 degrees F., as about 180 or 190 degrees F. The mixture of melt and suspended carbon is now pumped into a suitable filter, such as the well-known type of "auto" filter. The clear melt coming from the filter is known as the first filtrate and will have a hydrogen ion concentration often as high as 7.0 or 7.5.

The first filtrate thus obtained may now be subjected to a further purifying treatment as with a suitable purifying and filtering medium, such as a vegetable decolorizing carbon may be added to the mixture of melt and precipitate. For example, in the case of "Suchar" we may add an amount of decolorizing carbon equal to about 2 per cent. of the weight of the sugar solids present in the melt. The mixture is then pumped through a second auto filter and the clear liquor comprising the second filtrate thus obtained run through a bag filter and then through a felt and paper filter to a storage tank. From the storage tank it may run into an evaporator, where as is usual, it is desired to increase its density or concentration as to about 37 degrees Baumé corresponding to about 68 degrees Brix.

The concentration of the syrup preferably takes place under vacuum, the temperature being about 110 degrees F. or less. In those cases where the pH reading is corrected in the evaporator it is desirable to add the trisodium phosphate or its equivalent to the syrup when its density has been raised from about 60 to about 62 degrees Brix.

Where, instead of a refined, substantially colorless syrup it is desired to produce refined or granulated sugar directly from the sterilized melt after it reaches its destination, the desired result may be effected by treating the melt in a plurality of stages on the countercurrent principle with about 1½ to about 2 per cent. of Suchar or equivalent decolorizing carbon based on the eight of the sugar solids contained in the melt. In other words, the melt, the density of which has in this case also preferably been reduced as from about 50 to about 60 degrees Brix., may be treated with partially spent carbon which has already been used for a previous batch of melt treated with the partially spent carbon is subjected to treatment with virgin carbon in the amounts already indicated. The purified melt so obtained is sent to the evaporating pans where it is evaporated and refined or granulated sugar obtained by crystallization under vacuum, four or five strikes of sugar being so obtainable, the various strikes of sugar being mixed or blended together in the production of the refined or granulated sugar which will often be of standard or even superior purity and quality.

This completes the description of the aforesaid illustrative embodiments of the methods of the present invention. It will be noted that such methods are simple, may be easily and conveniently practised and have the numerous advantages and economies set forth in detail above. It will be noted that a melt of the desired density, hydrogen ion concentration and sterile qualities is obtained. From such melt, by means of the methods of the present invention, refined or substantially colorless syrups may readily be obtained in an altogether simple and economical manner. From such melts may also be obtained refined or granulated sugar of standard or even superior qualities in an altogether simple and effective manner. Other superiorities and advantages of the methods of the present invention and of the resulting products, particularly as exemplified in the aforesaid illustrative embodiments of the same, will readily occur to those skilled in the art to which the present invention relates.

It may here be stated that throughout the specification and claims, wherever the term "melt" is used, said term is intended to include also syrups of any desired degree of concentration, unless a contrary meaning is indicated.

What we claim as our invention is:

1. The method of preserving a sugar syrup or melt, which comprises treating the same with an agent of the group consisting of chlorine and the hypochlorites, then with a phosphatic defecating agent, and thereafter adding to the liquid so treated a decolorizing and filtering carbon.

2. The method of preserving a sugar syrup or melt, which comprises treating the same with a hypochlorite, then with a phosphatic defecating agent, and thereafter adding to the liquid so treated a decolorizing and filtering carbon.

3. The method of preserving a sugar syrup or melt, which comprises treating the same with calcium hypochlorite, then with a phosphatic defecating agent, and thereafter adding to the liquid so treated a decolorizing and filtering carbon.

4. The method of preserving a sugar syrup or melt, which comprises treating the same with an agent of the group consisting of chlorine and the hypochlorites, then with one of the phosphates of sodium, and thereafter adding to the liquid so treated a vegetable decolorizing and filtering carbon.

5. The method of preserving a sugar syrup or melt, which comprises treating the same with a hypochlorite, then with one of the phosphates of sodium, and thereafter adding to the liquid so treated a vegetable decolorizing and filtering carbon.

DANIEL V. WADSWORTH.
LEONARD WICKENDEN.